United States Patent
Tokumoto et al.

(10) Patent No.: US 7,500,408 B2
(45) Date of Patent: Mar. 10, 2009

(54) TORQUE DETECTION DEVICE

(75) Inventors: Yoshitomo Tokumoto, Nabari (JP);
Shingo Takayama, Kashiwara (JP);
Mikio Nozaki, Kashiwara (JP); Naoki Nakane, Toyota (JP)

(73) Assignees: JTEKT Corporation, Osaka (JP);
Denso Corporation, Aichi (JP)

( * ) Notice: Subject to any disclaimer, the term of this patent is extended or adjusted under 35 U.S.C. 154(b) by 142 days.

(21) Appl. No.: 11/669,509

(22) Filed: Jan. 31, 2007

(65) Prior Publication Data
US 2007/0186695 A1    Aug. 16, 2007

(30) Foreign Application Priority Data
Jan. 31, 2006  (JP) ............................. 2006-023774

(51) Int. Cl.
*G01L 3/00* (2006.01)
(52) U.S. Cl. ............................. 73/862.334; 73/862.321
(58) Field of Classification Search ............ 73/862.321, 73/862.325, 862.331–862.335
See application file for complete search history.

(56) References Cited

U.S. PATENT DOCUMENTS

| | | | |
|---|---|---|---|
| 4,862,982 A * | 9/1989 | Saito et al. ................. | 180/443 |
| 6,868,744 B2 * | 3/2005 | Sugimura et al. ...... | 73/862.333 |
| 6,928,887 B2 * | 8/2005 | Nakane et al. ......... | 73/862.331 |
| 6,928,888 B2 * | 8/2005 | Nakane et al. ......... | 73/862.332 |
| 6,988,422 B2 * | 1/2006 | Sugimura et al. ...... | 73/862.334 |
| 7,051,602 B2 * | 5/2006 | Nakane et al. ......... | 73/862.333 |
| 7,246,531 B2 * | 7/2007 | Nakane et al. ......... | 73/862.332 |
| 7,293,472 B2 * | 11/2007 | Tokumoto et al. ...... | 73/862.331 |

FOREIGN PATENT DOCUMENTS

| | | |
|---|---|---|
| JP | 2005-069994 A | 3/2005 |
| WO | 2005/111565 | 11/2005 |

* cited by examiner

*Primary Examiner*—Harshad Patel
*Assistant Examiner*—Freddie Kirkland, III
(74) *Attorney, Agent, or Firm*—Darby & Darby P.C.

(57) ABSTRACT

An inventive torque detection device includes: a magnetic circuit forming member having a tubular magnet provided at a first rotating body, and a magnetic ring that is located circumferentially of the tubular magnet and rotated together with a second rotating body connected to the first rotating body; a magnetic flux collecting ring part for collecting a generated magnetic flux; a detection part for detecting, based on a density of the collected magnetic flux, a torque applied to the first or second rotating body; and a molded body that is molded at an outer circumferential portion of the first rotating body, and is joined to longitudinal both sides of the tubular magnet so as to fix the tubular magnet to the first rotating body. A molding pressure, generated when the tubular magnet is molded, is applied in the longitudinal direction of the tubular magnet.

6 Claims, 9 Drawing Sheets

TORQUE DETECTION DEVICE

CROSS-REFERENCE TO RELATED APPLICATIONS

This Nonprovisional application claims priority under 35 U.S.C. §119(a) on Patent Application No. 2006-023774 filed in Japan on Jan. 31, 2006, the entire contents of which are hereby incorporated by reference.

BACKGROUND OF THE INVENTION

The present invention relates to a torque detection device for detecting a torque applied to a rotating body.

An exemplary torque detection device is disclosed in Japanese Patent Application Laid-Open No. 2005-69994 (which will be hereinafter simply called "conventional example"), for example. The torque detection device according to the conventional example includes: a magnetic circuit forming member having a tubular magnet provided at either one of input and output shafts connected via a torsion bar, and a magnetic ring that is located circumferentially of the tubular magnet and rotated together with the other one of the input and output shafts; a magnetic flux collecting ring part for collecting a magnetic flux generated by the magnetic circuit forming member; and a detection part for detecting, based on the density of the magnetic flux collected by the magnetic flux collecting ring part, a torque applied to the input shaft or the output shaft.

The torque detection device constructed in this manner is incorporated into an electric power steering apparatus for a vehicle. The electric power steering apparatus includes: an input shaft connected to a steering wheel; a housing for accommodating and supporting the input shaft; an electric motor connected to an output shaft via a deceleration mechanism; and a control unit which is connected to a circuit for driving the electric motor and a detection part, and in which a microprocessor is used. And the apparatus is constructed so that the detection part detects, due to a torsion generated in a torsion bar, a rotational torque applied to the input shaft by the steering of the steering wheel, and the electric motor is driven and controlled based on the detected torque.

The tubular magnet according to the conventional example is provided by sintering ferrite powder into a tubular shape. However, when the sintered tubular magnet is externally fitted and fixed to the input shaft, a crack is likely to occur due to a radial inner pressure generated at an inner circumferential portion of the tubular magnet. To cope with this, according to the conventional example, the tubular magnet is molded with a synthetic resin material in advance, and the molded tubular magnet is externally fitted and fixed to a knurled portion of the input shaft, which is located at its outer circumferential portion, thereby preventing a crack during the assembly of the tubular magnet.

BRIEF SUMMARY OF THE INVENTION

However, the torque detection device, in which the molded tubular magnet is externally fitted and fixed to the input shaft as disclosed in Japanese Patent Application Laid-Open No. 2005-69994, requires the step of molding the tubular magnet, and the step of fitting and fixing the molded tubular magnet. Therefore, the measures to improve the workability during assembly have been desired.

Figure 1:
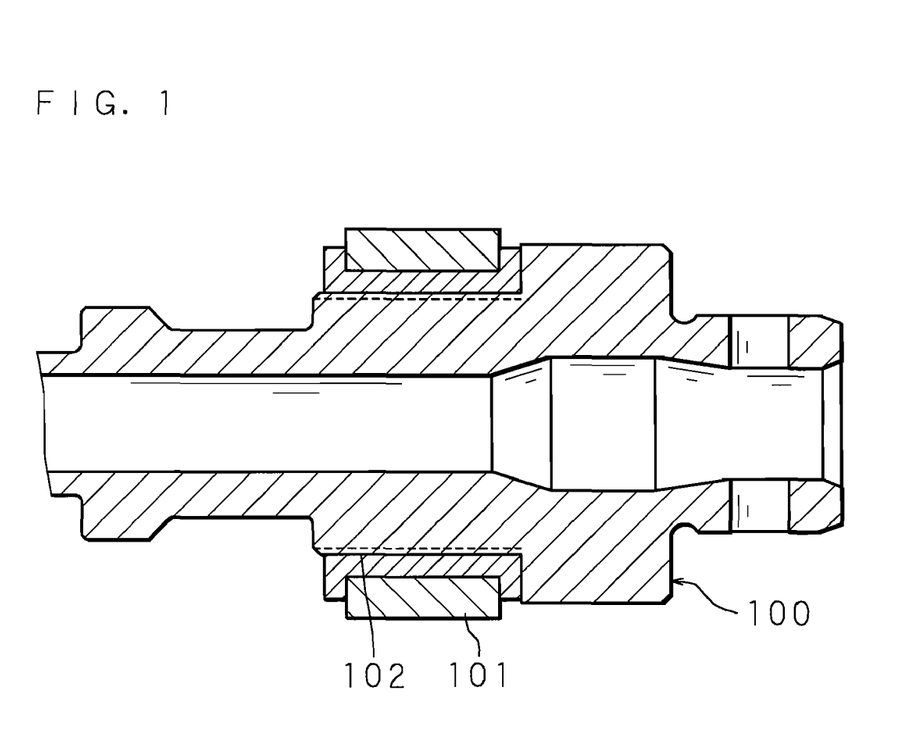
FIG. 1 is a partially enlarged cross-sectional view showing the constitution of an improved torque detection device.

FIG. 1 is a partially enlarged cross-sectional view showing the constitution of an improved torque detection device. As shown in FIG. 1, the applicant of the present invention has developed the torque detection device constructed in the following manner. An input shaft 100, and a tubular magnet 101, provided by sintering ferrite powder into a tubular shape, are held in a cavity of a molding die, and a molten synthetic resin material is injected into the cavity, thus molding an inner circumferential portion of the tubular magnet 101, and fixing the tubular magnet 101 to an outer circumferential portion of the input shaft 100 via a mold layer 102.

The torque detection device constructed in this manner can reduce the number of steps required for the assembly of the tubular magnet 101. However, when the molding is carried out in the cavity, the molding pressure of the molten synthetic resin material injected in the cavity is applied to an inner circumferential face of the tubular magnet 101, and due to this molding pressure, a crack might occur in the tubular magnet 101. Therefore, the measures to further improve the torque detection device have been desired.

The present invention has been made in view of the above-described problems, and its main object is to provide a torque detection device that can prevent a tubular magnet, fixed to a rotating body by molding, from being cracked due to a molding pressure.

A torque detection device according to a first aspect includes: a magnetic circuit forming member having a tubular magnet externally fitted and fixed to a first rotating body, and a magnetic ring that is located circumferentially of the tubular magnet and rotated together with a second rotating body connected to the first rotating body; a magnetic flux collecting ring part for collecting a magnetic flux generated by the magnetic circuit forming member; and a detection part for detecting, based on a density of the magnetic flux collected by the magnetic flux collecting ring part, a torque applied to the first or second rotating body, the device characterized by further including a molded body that is molded at an outer circumferential portion of the first rotating body, and is joined to at least longitudinal one side of the tubular magnet so as to fix the tubular magnet to the first rotating body.

In the torque detection device according to the first aspect, the molded body is molded at the outer circumferential portion of the first rotating body, and is joined to at least longitudinal one side of the tubular magnet so as to fix the tubular magnet; therefore, when the tubular magnet is fixed to the rotating body in a cavity of a molding die, the molded body can be molded while a molding pressure in the cavity is applied to a longitudinal end portion of the tubular magnet. Accordingly, it is possible to prevent a crack from being caused in the tubular magnet due to the molding pressure. Furthermore, compared with the case where an inner circumferential portion of the tubular magnet is molded, the amount of molding material can be decreased, and thus cost reduction is enabled.

A torque detection device according to a second aspect is characterized in that the molded body is molded on longitudinal both sides of the tubular magnet.

In the torque detection device according to the second aspect, the molded body is molded on both sides of the tubular magnet; therefore, it is possible to fix the tubular magnet to a predetermined position without providing any stopper for preventing the longitudinal displacement of the tubular magnet, thus simplifying the structure of the rotating body, and enabling the cost reduction.

A torque detection device according to a third aspect is characterized in that an outer edge of an end portion of the tubular magnet is chamfered, and the molded body is joined to a chamfered portion of the tubular magnet.

In the torque detection device according to the third aspect, when the tubular magnet is fixed to the rotating body in a cavity of a molding die, a molding pressure in the cavity can be applied to longitudinal one end and/or other end of the tubular magnet, and to the chamfered portion of outer edge of the tubular magnet. Accordingly, the molding pressure applied to the tubular magnet can be distributed in the longitudinal direction thereof, and radially inward in the direction intersecting the longitudinal direction, thus making it harder for the tubular magnet to be cracked due to the molding pressure.

A torque detection device according to a fourth aspect is characterized in that the tubular magnet is molded with a synthetic resin material.

In the torque detection device according to the fourth aspect, since the tubular magnet is molded, it is possible to make it harder for the tubular magnet to be cracked in the case where an impact force is externally applied to the tubular magnet during assembly and the like. Further, even if the tubular magnet is cracked, it is possible to eliminate the possibility of scattering of the magnet, and to prevent a change in the magnetic characteristic.

The above and further objects and features of the invention will more fully be apparent from the following detailed description with accompanying drawings.

DETAILED DESCRIPTION OF THE INVENTION

Hereinafter, embodiments of the present invention will be described in detail with reference to the drawings.

EMBODIMENT 1

Figure 2:
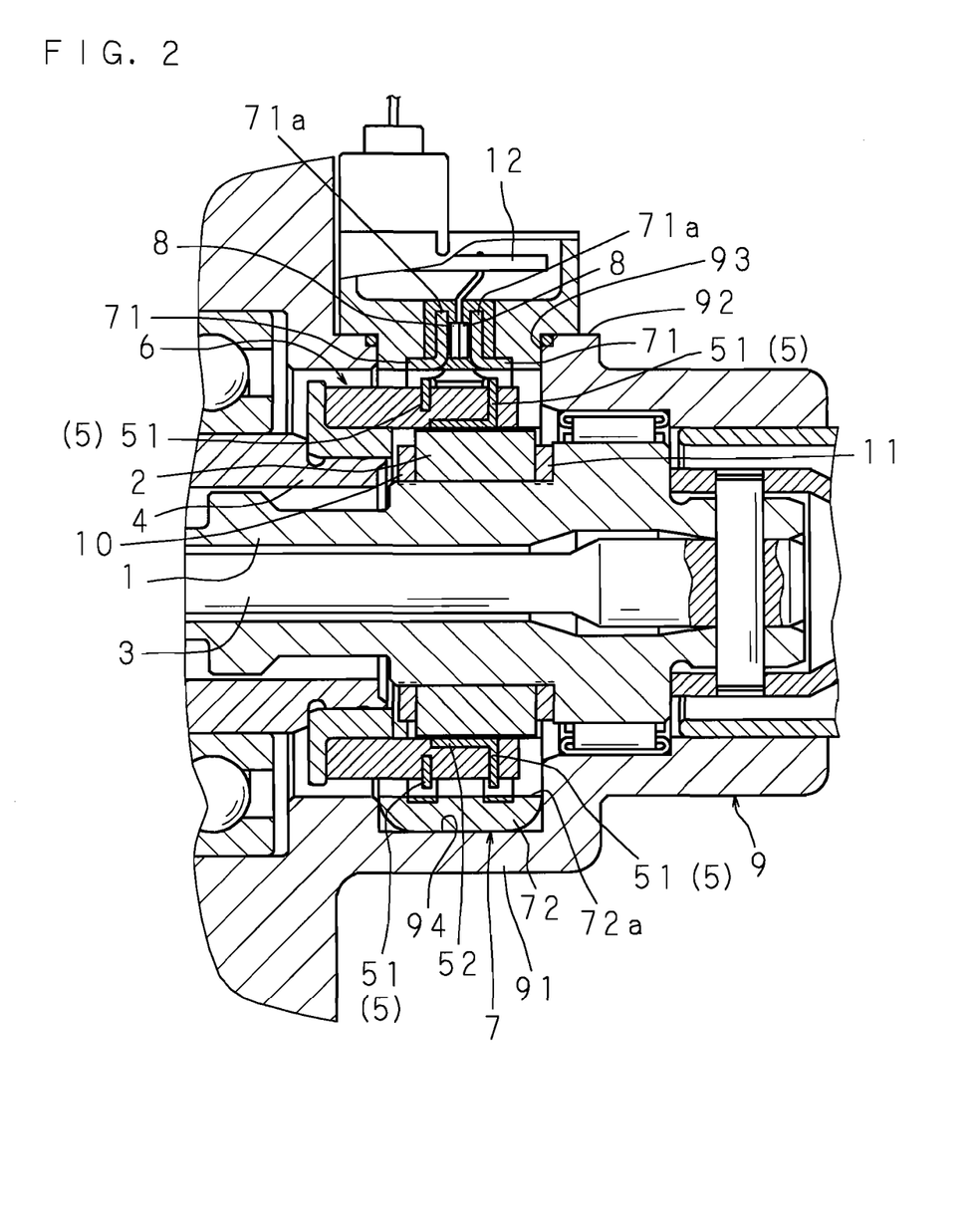
FIG. 2 is a cross-sectional view of a torque detection device according to the present invention, inserted into a housing.
Figure 3:
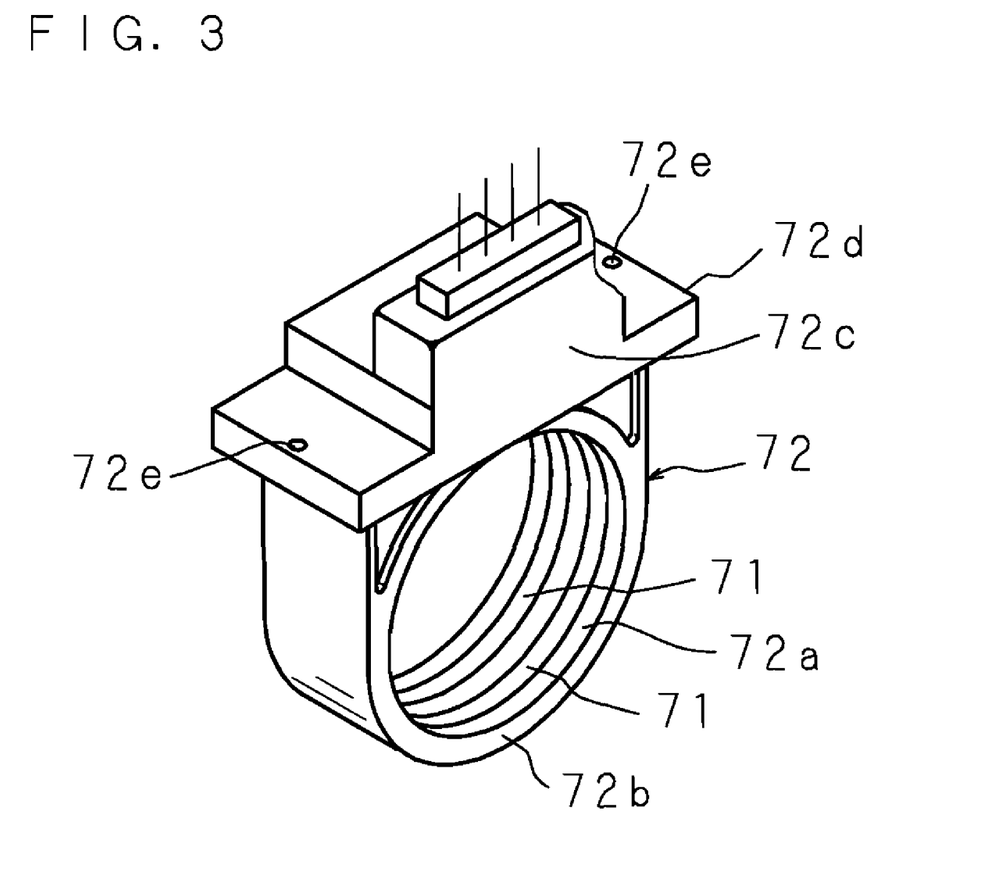
FIG. 3 is a perspective view of the torque detection device according to the present invention.
Figure 4:
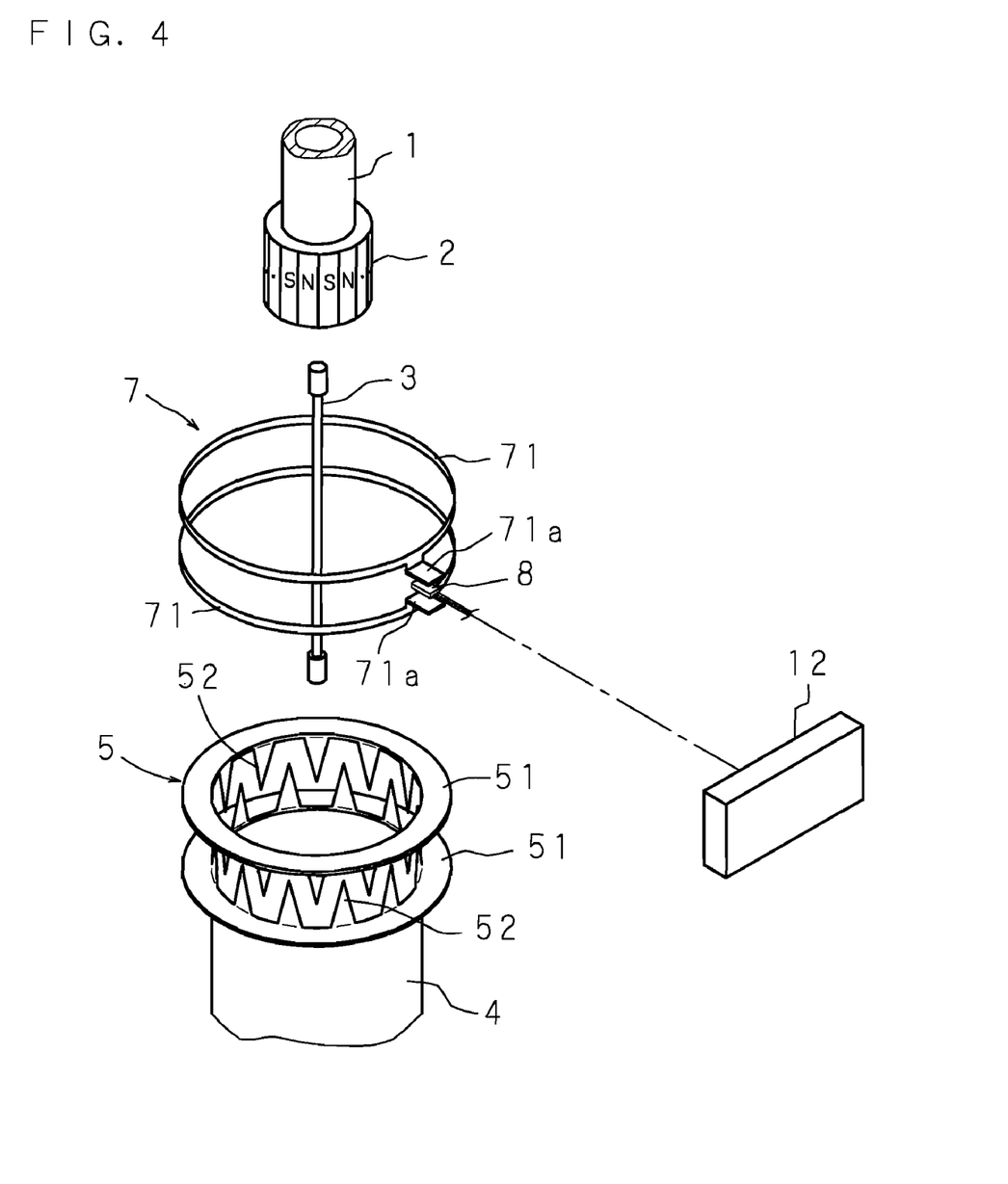
FIG. 4 is a schematic exploded perspective view of the torque detection device according to the present invention.
Figure 5:
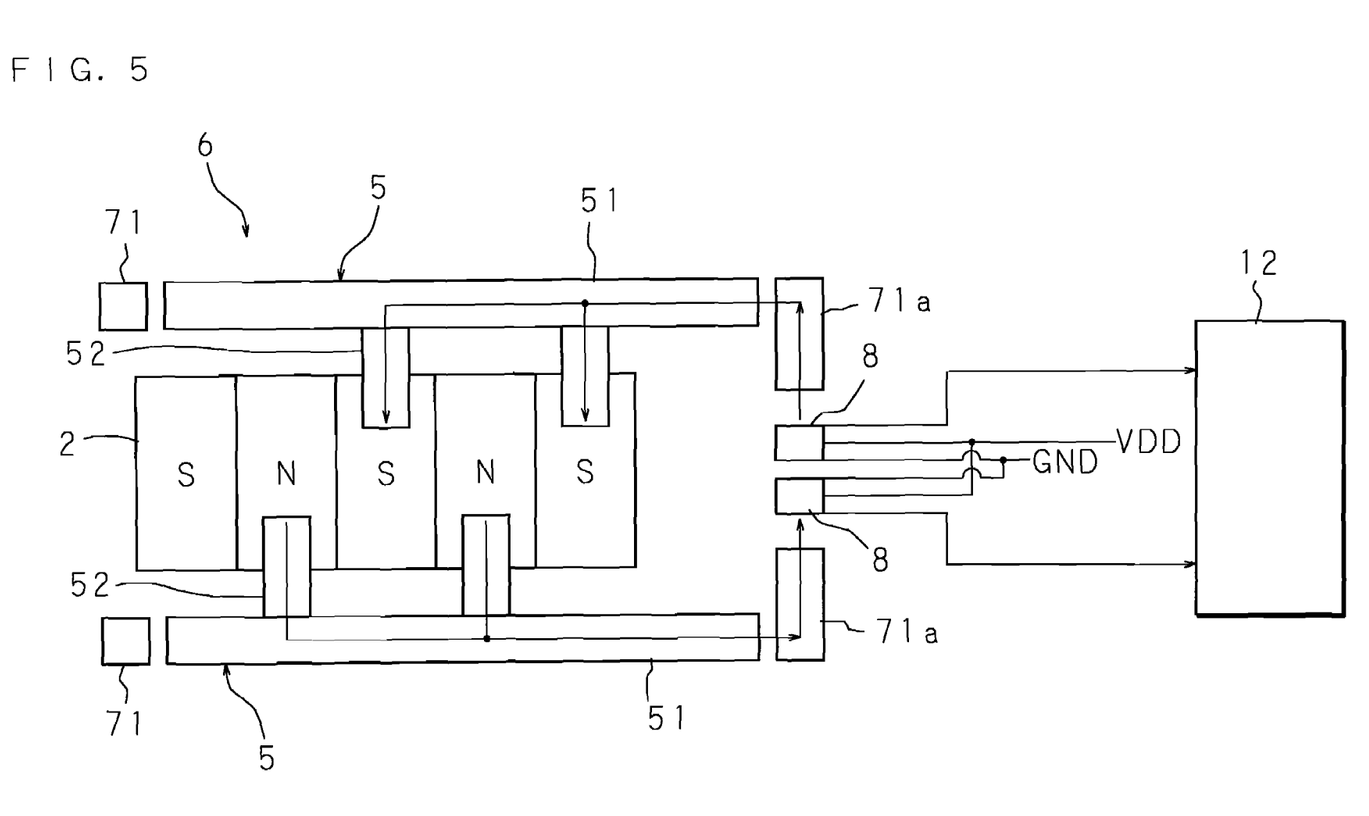
FIG. 5 is a diagram for describing a magnetic circuit generated when a rotating body is rotated in one direction.
Figure 6:
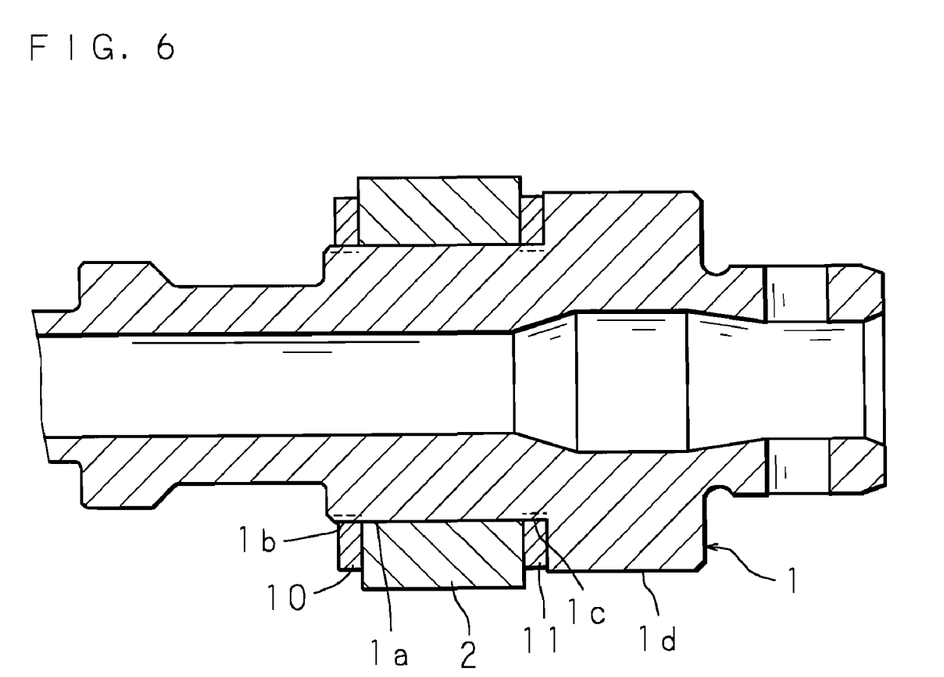
FIG. 6 is an enlarged cross-sectional view of a principal part of the torque detection device according to the present invention.

FIG. 2 is a cross-sectional view of a torque detection device according to the present invention, inserted into a housing. FIG. 3 is a perspective view of the inventive torque detection device. FIG. 4 is a schematic exploded perspective view of the inventive torque detection device. FIG. 5 is a diagram for describing a magnetic circuit generated when a rotating body is rotated in one direction. And FIG. 6 is an enlarged cross-sectional view of a principal part of the inventive torque detection device.

An inventive torque detection device includes: a magnetic circuit forming member 6 having a tubular magnet 2 externally fitted and fixed to an outer circumferential portion of a first rotating body 1, and two magnetic rings 5, 5 that are located circumferentially of the tubular magnet 2 and rotated together with a second rotating body 4 connected coaxially with the first rotating body 1 via a torsion bar 3; a magnetic flux collecting ring part 7 for collecting a magnetic flux generated by the magnetic circuit forming member 6; and a detection part 8 for detecting, based on the density of a magnetic flux collected by the magnetic flux collecting ring part 7, the torque applied to the first rotating body 1.

The first rotating body 1 is provided, at its outer circumferential part, with: a first fitting portion 1a to which the tubular magnet 2 is externally fitted; first and second rotation preventing portions 1b and 1c at which concavity and convexity are peripherally provided in parallel with the axis on both sides of the first fitting portion 1a; and a second fitting portion 1d that is continuous with the second rotation preventing portion 1c via a radial step.

The tubular magnet 2 is formed into a multi-pole magnetized cylinder in which north and south poles are alternately magnetized in circumferential positions. The tubular magnet 2 is provided by sintering ferrite powder into cylindrical shape, and the tubular magnet 2 is externally fitted to the first fitting portion 1a of the first rotating body 1. And in the state where this first rotating body 1 is accommodated and held in a cavity of a molding die, a molten synthetic resin material is filled in the cavity, thereby molding first and second molded bodies 10 and 11 on longitudinal both sides of the tubular magnet 2. These molded bodies 10 and 11 are joined to both ends of the tubular magnet 2, and connected to the first and second rotation preventing portions 1b and 1c of the first rotating body 1, thus allowing the molded bodies 10 and 11 to be integral with the tubular magnet 2 and the first rotating body 1. Thereafter, the magnetization is carried out as described above.

The magnetic rings 5, 5 have: two opposing annular plates 51, 51 separated from each other in the axial direction of the second rotating body 4; and a plurality of comb teeth 52, 52 extended close to each other from inner circumferential portions of the annular plates 51, 51. And the magnetic rings 5, 5 are formed so that the magnetic flux density between the magnetic rings 5, 5 is changed due to the relative rotation with the tubular magnet 2. Furthermore, the comb teeth 52, 52 are arranged at equal intervals such that they intermesh alternately in the circumferential direction, and the magnetic rings 5, 5 are molded with a synthetic resin material in the state where the comb teeth 52, 52 intermesh alternately, thus providing a molded body.

The magnetic flux collecting ring part 7 includes: two magnetic flux collecting rings 71, 71 arranged so as to be axially separated from each other; and a holding ring 72 for holding each of the magnetic flux collecting rings 71, 71 by molding them. The magnetic flux collecting rings 71, 71 form a cylindrical shape having convex pieces 71a, 71a extended radially outward from circumferential portions of the magnetic flux collecting rings 71, 71 so as to be located on both sides of the detection part 8, thus allowing the convex pieces 71a, 71a to collect a magnetic flux. Moreover, the magnetic flux collecting rings 71, 71 are formed magnetic plates such as a steel plate.

The holding ring 72 has: a through hole 72a corresponding to inner circumferential faces of the magnetic flux collecting rings 71, 71; a ring body 72b to which the magnetic flux collecting rings 71, 71 are internally fitted and fixed; and an attachment portion 72c protruded at an outer circumferential portion of the ring body 72b. The ring body 72b and the attachment portion 72c are integrally molded with a synthetic resin material. The ring body 72b is located within the housing 9 as shown in FIG. 2. On the other hand, the attachment portion 72c is located outwardly of the housing 9, and is attached to an attachment seat 92 of the housing 9. The attachment portion 72c has a flange 72d protruded in the tangential direction of the ring body 72b. A detection circuit board 12 connected to the detection part 8 is accommodated inside the attachment portion 72c. The flange 72d is provided with insertion holes 72e, 72e through which small screws are to be inserted.

The detection part 8 includes a Hall element whose electrical characteristic (resistance) varies in accordance with a change in the magnetic flux density generated between the convex pieces 71a, 71a of the magnetic flux collecting rings 71, 71, and is configured so as to change a detection signal in accordance with a change in the magnetic flux density generated between the convex pieces 71a, 71a of the magnetic flux collecting rings 71, 71. A detection signal from the detection part 8 is sent to the detection circuit board 12. It should be noted that other than a Hall element, the detection part 8 may alternatively have a magnetic sensing element whose electrical characteristic (resistance) varies due to a magnetic field effect, such as a magnetoresistance effect element (MR element); therefore, a constituent element of the detection part 8 is not limited to a Hall element.

The housing 9 has: a cylindrical part 91 surrounding the magnetic circuit forming member 6; the attachment seat 92 which is protruded at an outer circumferential portion of the cylindrical part 91, and to which the holding ring 72 is to be attached; a through hole 93 that radially passes through the attachment seat 92 and that forms a rectangular cross section for allowing the magnetic flux collecting rings 71, 71 and the ring body 72b to be located inside the cylindrical part 91; and a fitting groove 94 that is continuous with the through hole 93 and is bent in a manner corresponding to the shape of the ring body 72b of the holding ring 72. The attachment seat 92 is formed into a rectangular annular shape and is opposed to the flange 72d. The attachment seat 92 is provided with two screw holes corresponding to the insertion holes 72e, 72e.

In the torque detection device constructed as described above, the ring body 72b of the holding ring 72 is inserted into the cylindrical part 91 through the through hole 93 that radially passes through the cylindrical part 91 of the housing 9, and the ring body 72b is allowed to engage with the fitting groove 94, thus determining the position of the magnetic flux collecting rings 71, 71 inside the cylindrical part 91, and attaching the flange 72d of the holding ring 72 to the attachment seat 92 by using small screws. Thereafter, the first rotating body 1 holding the tubular magnet 2 and the second rotating body 4 holding the magnetic rings 5, 5 are inserted into the cylindrical part 91 from the axial direction of the cylindrical part 91 so that the tubular magnet 2 and magnetic rings 5, 5 are located inwardly of the magnetic flux collecting ring part 7.

EMBODIMENT 2

Figure 7:
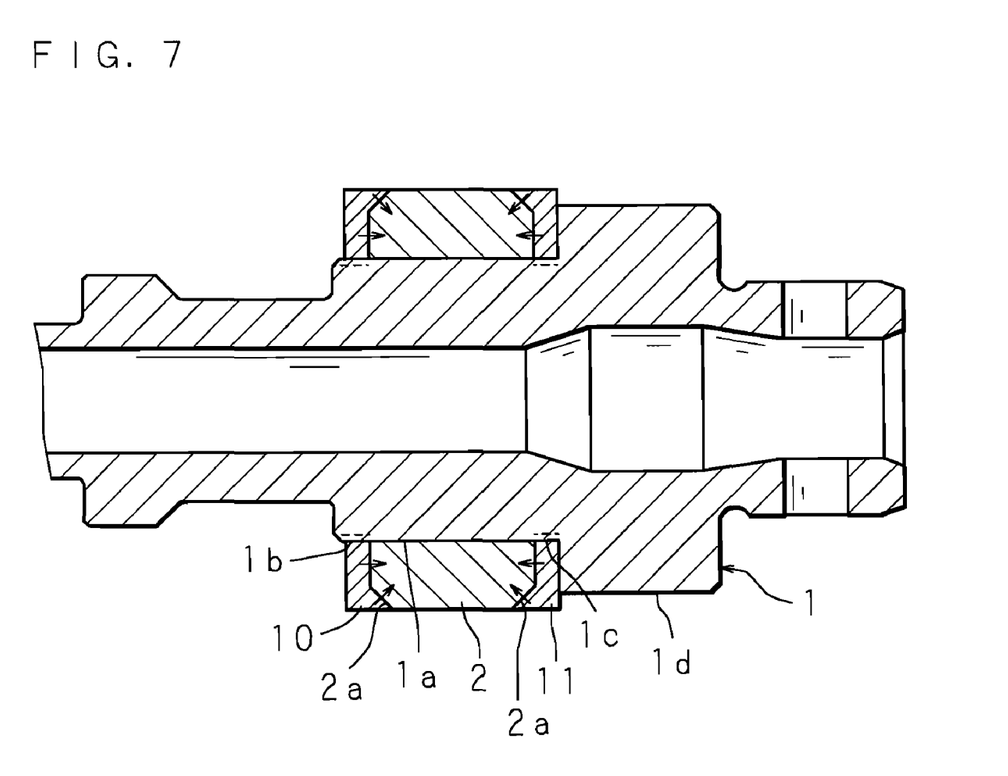
FIG. 7 is an enlarged cross-sectional view showing the constitution of a principal part of a torque detection device according to the present invention.

FIG. 7 is an enlarged cross-sectional view showing the constitution of a principal part of a torque detection device according to the present invention. In this torque detection device, outer edges of both ends of the tubular magnet 2 are chamfered to provide chamfered portions 2a, 2a, and the first and second molded bodies 10 and 11 are joined to the two chamfered portions 2a, 2a.

In Embodiment 2, since a molding pressure generated in a cavity can be applied to the longitudinal both ends of the tubular magnet 2 and to the chamfered portions 2a, 2a of the outer edges, the molding pressure applied to the tubular magnet 2 can be distributed in the longitudinal direction thereof, and radially inward in the direction intersecting the longitudinal direction, thus making it harder for the tubular magnet 2 to be cracked due to the molding pressure.

Other constitutions and operations are the same as in Embodiment 1; therefore, the same components are identified by the same reference numerals, and the detailed description thereof and the description of operational effects thereof will be omitted.

EMBODIMENT 3

Figure 8:
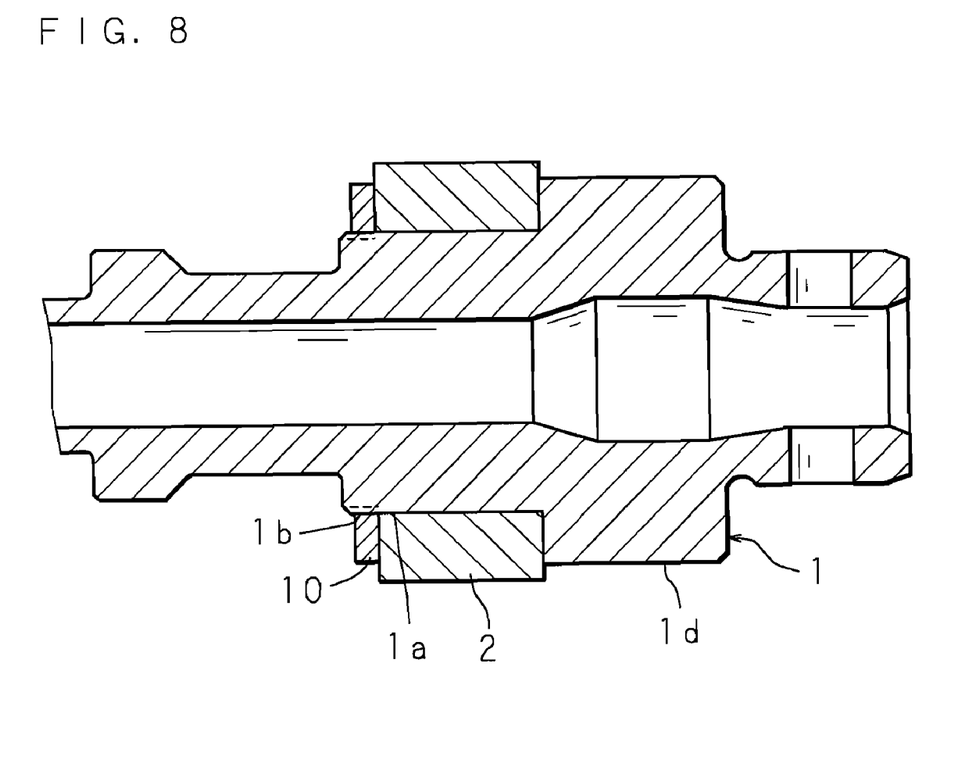
FIG. 8 is an enlarged cross-sectional view showing the constitution of a principal part of a torque detection device according to the present invention.

FIG. 8 is an enlarged cross-sectional view showing the constitution of a principal part of a torque detection device according to the present invention. In this torque detection device, the second rotation preventing portion 1c and the second molded body 11 according to Embodiment 1 are not provided, and the first molded body 10 is provided on longitudinal one end of the tubular magnet 2 so that the other end of the tubular magnet 2 is abutted against a step of the second fitting portion 1d.

In Embodiment 3, a molding pressure generated in a cavity can be applied to longitudinal one side of the tubular magnet 2, the molding pressure applied to the tubular magnet 2 can be reduced, and the cracking of the tubular magnet 2 due to the molding pressure can be further reduced.

Other constitutions and operations are the same as in Embodiment 1; therefore, the same components are identified by the same reference numerals, and the detailed description thereof and the description of operational effects thereof will be omitted.

EMBODIMENT 4

Figure 9:
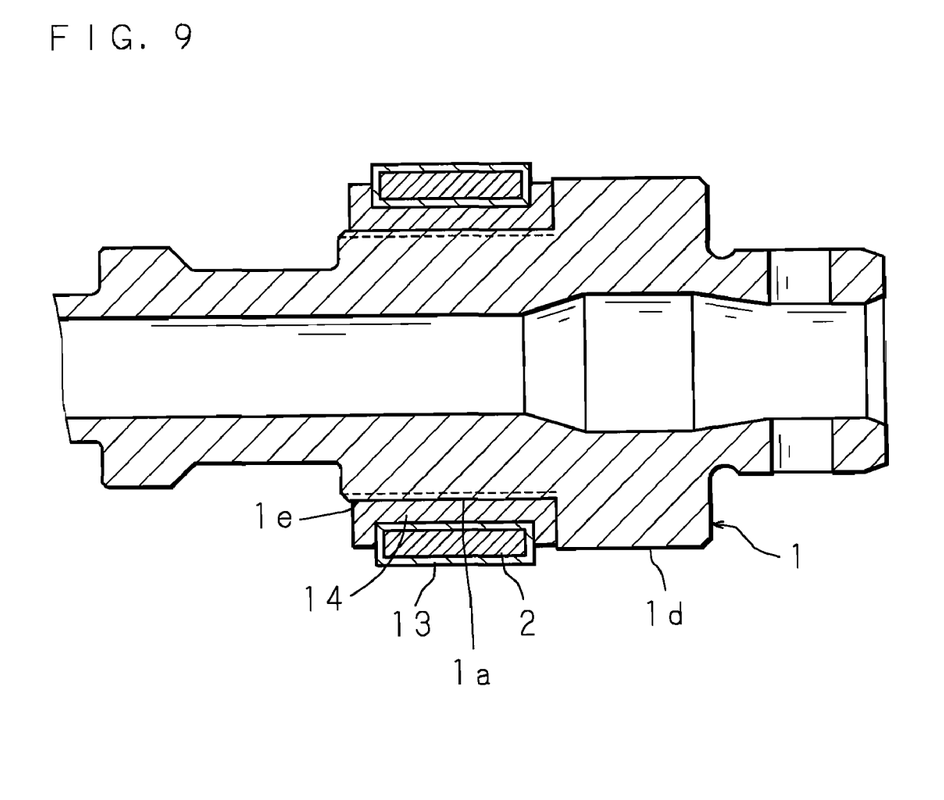
FIG. 9 is an enlarged cross-sectional view showing the constitution of a principal part of a torque detection device according to the present invention.

FIG. 9 is an enlarged cross-sectional view showing the constitution of a principal part of a torque detection device according to the present invention. In this torque detection device, the first fitting portion 1a is provided with a third rotation preventing portion 1e at which concavity and convexity are peripherally provided in parallel with the axis, and the tubular magnet 2 is entirely molded with a thermoplastic synthetic resin material having a high mechanical strength and a high moldability, thus providing a mold layer 13. The molded tubular magnet 2 and the first rotating body 1 are held in a cavity of a molding die, and a thermoplastic molten synthetic resin material, having a high heat resistance and a high dimensional stability, is injected into the cavity, thus molding an inner circumferential portion of the pre-molded tubular magnet 2. Via a mold portion 14 resulting from this molding, the tubular magnet 2 is fixed to the third rotation preventing portion 1e.

In Embodiment 4, since the tubular magnet 2 is entirely molded, it is possible to make it harder for the tubular magnet 2 to be cracked in the case where an impact force is externally applied to the tubular magnet 2 during assembly and the like. Further, even if the tubular magnet 2 is cracked, it is possible to eliminate the possibility of scattering of the magnet, and to prevent a change in the magnetic characteristic. Furthermore, since the tubular magnet 2 is entirely molded with a thermoplastic synthetic resin material having a high mechanical strength and a high moldability, the mold layer can be relatively thinned. Moreover, since the tubular magnet 2 is fixed by carrying out the molding thereof with a thermoplastic synthetic resin material having a high heat resistance and a high dimensional stability, it is possible to make it hard for the torque detection to be affected by the environmental changes around the torque detection device.

Other constitutions and operations are the same as in Embodiment 1; therefore, the same components are identified by the same reference numerals, and the detailed description thereof and the description of operational effects thereof will be omitted.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque detection device comprising:
   a magnetic circuit forming member having a tubular magnet externally fitted and fixed to a first rotating body, and a magnetic ring that is located circumferentially of the tubular magnet and rotated together with a second rotating body connected to the first rotating body;
   a magnetic flux collecting ring part for collecting a magnetic flux generated by the magnetic circuit forming member;
   a detection part for detecting, based on a density of the magnetic flux collected by the magnetic flux collecting ring part, a torque applied to the first or second rotating body; and
   a first molded body that is positioned at a first end of the tubular magnet along a longitudinal direction of the first rotating body, the first molded body being integrally molded to an outer circumferential portion of the first rotating body that extends away from the first end of the tubular magnet in the longitudinal direction and to the first end of the tubular magnet so as to fix the tubular magnet to the first rotating body.

2. The torque detection device according to claim 1, further comprising:
   a second molded body integrally molded to a second outer circumferential portion of the first rotating body and to a second end of the tubular magnet along the longitudinal direction of the first rotating body.

3. The torque detection device according to claim 2, wherein an outer edge of one of the first and second ends of the tubular magnet is chamfered, and one of the first and second molded bodies is joined to the chamfered edge of the tubular magnet.

4. The torque detection device according to claim 3, wherein an outer edge of the other one of the first and second ends of the tubular magnet is chamfered, and the other one of the first and second molded bodies is joined to the chamfered edge of the other one of the first and second ends of the tubular magnet.

5. The torque detection device according to claim 1, wherein an outer edge of the first end of the tubular magnet is chamfered, and the first molded body is joined to the chamfered edge of the tubular magnet.

6. The torque detection device according to claim 1, wherein the tubular magnet is molded with a synthetic resin material.

* * * * *